(12) United States Patent
Gonring

(10) Patent No.: US 6,597,998 B1
(45) Date of Patent: Jul. 22, 2003

(54) METHOD FOR DETERMINING THE AMOUNT OF LIQUID IN A RESERVOIR AS A FUNCTION OF DEPTH OF THE LIQUID

(75) Inventor: Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/043,022

(22) Filed: Jan. 9, 2002

(51) Int. Cl.⁷ .............................. G01F 17/00; G01F 1/12
(52) U.S. Cl. ........................ 702/55; 702/100; 73/1.73; 73/149; 73/290 R
(58) Field of Search ................... 702/55, 100; 73/149, 73/1.73, 1.74, 291, 298, 290 R

(56) References Cited

U.S. PATENT DOCUMENTS

| | | | |
|---|---|---|---|
| 4,349,882 A | * 9/1982 | Asmundsson et al. | 702/52 |
| 4,358,947 A | 11/1982 | Greene et al. | |
| 4,437,162 A | * 3/1984 | Kato | 702/55 |
| 4,724,705 A | 2/1988 | Harris | |
| 4,731,730 A | 3/1988 | Hedrick et al. | |
| 4,736,329 A | * 4/1988 | Ferretti et al. | 73/291 |
| 4,819,483 A | * 4/1989 | Emplit et al. | 702/100 |
| 4,840,064 A | 6/1989 | Fudim | |
| 4,884,444 A | 12/1989 | Tuckey | |
| 4,928,525 A | * 5/1990 | Aderholt et al. | 702/55 |
| 4,977,528 A | * 12/1990 | Norris | 702/100 |
| 5,124,933 A | * 6/1992 | Maier | 702/55 |
| 5,297,423 A | * 3/1994 | Keating et al. | 73/49.2 |
| 5,315,867 A | 5/1994 | Hartel et al. | |
| 5,485,740 A | 1/1996 | Lippmann et al. | |
| 5,544,518 A | * 8/1996 | Hart et al. | 73/1.73 |
| 5,665,895 A | * 9/1997 | Hart et al. | 73/1.73 |
| 5,752,409 A | 5/1998 | Lippmann et al. | |
| 6,253,607 B1 | * 7/2001 | Dau | 73/290 R |
| 6,289,728 B1 | 9/2001 | Wilkins | |
| 6,397,668 B1 | * 6/2002 | Davison et al. | 73/291 |

FOREIGN PATENT DOCUMENTS

| | | | | |
|---|---|---|---|---|
| DE | 3825630 A1 | * | 2/1990 | 73/209 R |
| JP | 55033658 A | * | 8/1976 | 73/291 |
| JP | 61259123 A | * | 11/1986 | 73/149 |

* cited by examiner

Primary Examiner—Edward Lefkowitz
Assistant Examiner—Michael Cygan
(74) Attorney, Agent, or Firm—William D. Lanyi

(57) ABSTRACT

A self calibration system is provided for a fuel tank in which a method is applied to dynamically determine the relationship between the remaining fuel in the tank and the measured depth of that remaining fuel. It is not necessary to provide the specific volume-to-depth relationship prior to operation of the marine vessel. Based on initial estimation of this relationship, which can be a linear estimation, the actual relationship is determined based on measured fuel depth changes and measured fuel consumptions which are contemporaneous with the measurement of the depth changes.

23 Claims, 12 Drawing Sheets

| DEPTH | VOLUME | ESTIMATE |
|---|---|---|
| 0 | 0 | 0 |
| 1 | 4 | 14.8 |
| 2 | 12 | 29.6 |
| 3 | 24 | 44.4 |
| 4 | 40 | 59.2 |
| 5 | 58 | 74 |
| 6 | 76 | 88.8 |
| 7 | 94 | 103.6 |
| 8 | 112 | 118.4 |
| 9 | 130 | 133.2 |
| 10 | 148 | 148 |

| DEPTH | VOLUME | ESTIMATE | KNOWN |
|---|---|---|---|
| 0 | 0 | 0.00 | |
| 1 | 4 | 13.43 | |
| 2 | 12 | 26.86 | |
| 3 | 24 | 40.29 | |
| 4 | 40 | 53.71 | |
| 5 | 58 | 67.14 | |
| 6 | 76 | 80.57 | |
| 7 | 94 | 94.00 | 94 |
| 8 | 112 | | 112 |
| 9 | 130 | | 130 |
| 10 | 148 | | 148 |

FIG. 7

| DEPTH | VOLUME | ESTIMATE | KNOWN |
|---|---|---|---|
| 0 | 0 | 0.00 | |
| 1 | 4 | 10.00 | |
| 2 | 12 | 20.00 | |
| 3 | 24 | 30.00 | |
| 4 | 40 | 40.00 | 40 |
| 5 | 58 | | 58 |
| 6 | 76 | | 76 |
| 7 | 94 | | 94 |
| 8 | 112 | | 112 |
| 9 | 130 | | 130 |
| 10 | 148 | | 148 |

FIG. 9

METHOD FOR DETERMINING THE AMOUNT OF LIQUID IN A RESERVOIR AS A FUNCTION OF DEPTH OF THE LIQUID

BACKGROUND OF THE INVENTION

1. Field of the Invention

The present invention is generally related to a method for determining the amount of liquid in a reservoir as a function of a linear measurement provided by a depth determining device and, more particularly, to a method for automatically calibrating the relationship between the liquid depth and the volume of the liquid remaining in the reservoir notwithstanding the potentially non uniform shape of the liquid reservoir.

2. Description of the Prior Art

Many different types of fuel tanks and fuel depth sensors are known to those skilled in the art. Most fuel tanks are provided with a sensor that determines, either directly or indirectly, the amount of liquid fuel remaining in the fuel tank. Most typically, a float mechanism is used to measure the depth of the liquid in the reservoir and that measured depth is used to determine or represent the amount of liquid remaining in the reservoir. These types of devices are most commonly used in fuel tanks, such as the fuel tanks of automobiles, boats, and other vehicles.

When a fuel tank, or other liquid reservoir, has an irregular shape, the relationship between the depth of the fluid within the reservoir and the volume of fluid remaining in the reservoir is not always linear. In other words, each decrease in the depth, by a particular incremental magnitude, does not always represent the same change in the liquid volume remaining in the reservoir. Most fuel tanks are not purely parallelepipeds, with six parallel faces. If the tank is a parallelepiped, the volume remaining in the tank generally has a linear relationship with the depth of the liquid actually remaining in the tank. However, this is rarely the case in actual practice since most fuel tanks have irregular shapes, particularly when used in marine vessels.

Many different approaches have been used to address the accuracy of fuel measurement in these types of situations.

U.S. Pat. No. 5,485,740, which issued to Lippmann et al on Jan. 23, 1996, describes a method of calibration for gauging fuel in an automotive tank. The maximum fuel level is determined in a fuel tank of undetermined size using a fuel level sender which is referenced to the tank bottom. A minimum full value is selected for a given type of tank and when the sender signal goes below a percentage of that value and subsequently goes above the minimum full value, a fueling event is recognized and the current fuel sender value is adopted as the maximum full value. Where a heavily filtered signal is used to minimize the effect of fuel slosh, the maximum full value is subject to increasing to higher values occurring during a short period after fueling to allow recovery of the filtered signal. An empty value is calibrated before the vehicle is initially fueled. A maximum empty level is initially set and if a lower level is measured when the ignition is turned on, the lower level is set as the empty value. This calibration is terminated when the tank is fueled above the minimum full value.

U.S. Pat. No. 5,752,409, which issued to Lippmann et al on May 19, 1998, describes a method of accurately gauging fuel in an automotive tank. This patent is generally related to U.S. Pat. No. 5,485,740.

U.S. Pat. No. 6,289,728, which issued to Wilkins on Sep. 18, 2001, describes an apparatus and method for determining the amount of liquid contained in a storage tank. A tube has a closed bottom end and is disposed within the tank in a substantial vertical orientation with the closed end of the tube immersed in the liquid and the open end of the tube protruding from the top of the tank. An elongate member has a longitudinal edge defining a varying profile corresponding to the predetermined relationship between the liquid level and the barometric content. This member is slidably received within the tube. A float is slidable vertically along the exterior of the tube and is magnetically coupled to the elongate member such that as the float rises or falls in response to a change in liquid level, the elongate member will be vertically displaced within the tube. A measuring device position proximate the open end of the tube measures the distance between the longitudinal edge of the elongate member and a reference plane aligned substantially parallel to the longitudinal axis of the elongate member, the distance being directly proportional to the volumetric content of liquid contained in the tank.

U.S. Pat. No. 4,731,730, which issued to Hedrick et al on Mar. 15, 1988, describes a universal fuel quantity indicator apparatus. The apparatus includes a digital fuel quantity indicator having an internal microprocessor control unit and a removably connectable digital calibration trim interface which enables the fuel quantity indicator to be reconfigured for different fuel tanks by varying selectable fuel tank parameters, such as constants associated with a fuel quantity determination based on calculations of capacitance of a tank capacitor array and a compensator capacitor. The interface includes up/down steering control buttons which control selection and storage and of the selected parameters, a mode selection jumper which selects between a RUN mode a CALIBRATE mode for the indicator, and an alternate static memory which stores the configured parameters for loading to the indicator internal static memory associated with the microprocessor in the CALIBRATE mode to configure the indicator for a specific fuel tank.

U.S. Pat. No. 4,724,705, which issued to Harris on Feb. 16, 1988, describes a fuel gauge. The apparatus is provided for determining the quantity of fuel in a fuel tank having a contoured interior wall. The apparatus includes a buoyant member for floating on the top surface of fuel in the fuel tank, a conductor supported on the buoyant member to float therewith, and a pattern of resistance in electrical contact with the floating conductor. The pattern of resistance is selected to correspond to the contour of the interior wall. Thus, the resistance pattern is coded to represent the volume profile of the fuel tank. A voltage is applied across the conductor and the pattern of resistance. The floating conductor and the pattern of resistance cooperate to provide a value of resistance corresponding to the depth of fuel in the fuel tank at the measurement location. An indicator interprets that value of resistance to determine the instantaneous quantity of fuel in the fuel tank.

U.S. Pat. No. 4,358,947, which issued to Greene et al on Nov. 16, 1982, describes a method and apparatus for volumetric calibration of liquid flow sensor output signals. A liquid flow sensor produces output signals which are monitored over a known volume of flowing liquid. That monitored signal value is scaled according to a predetermined volume of liquid to provide a correction factor, whereby the output signal of the flow sensor is continually corrected to provide an expected number of flow sensor pulses per unit volume.

U.S. Pat. No. 5,315,867, which issued to Hartel et al on May 31, 1994, describes an apparatus for measuring the fraction of liquid fuel in a fuel tank. The quantity of fuel in a fuel tank is measured by determining the displacement of a membrane and pressure values from a sensor. The displacement values of the membrane are representative of volume changes in a gas chamber in the tank while the pressure values in the sensor are representative of the pressure of the gas chamber. With these values, the fuel content in the gas tank can be determined from the general equation of state of an ideal gas. In order to displace the membrane, an electric motor drives a step down transmission which in turn drives a spindle mechanism which is coupled to the membrane.

U.S. Pat. No. 4,840,064, which issued to Fudim on Jun. 20, 1989, describes a liquid volume monitoring apparatus and method. The apparatus is disclosed for determining the volume of liquid in a container which is being provided with an in flow and an out flow of liquid such that there normally remains an ullage volume in the container filled with gas. A timer actuated valve is provided for interrupting one of the in flow and the out flow of liquid. A pressure sensor detects the pressure of the gas in the ullage volume of the container during the interruption of the one of the in flow and out flow of the liquid and a microprocessor calculates the volume of liquid in the container from the detected change in pressure of the gas during the interruption. The apparatus and associated method are particularly advantageous for determining the volume of liquid in a liquid reservoir of an integrated drive generator of an aircraft engine since the determination of the liquid volume can be accomplished with the reservoir of irregular shape in various attitudes, at various temperatures and under conditions of acceleration and minimal additional weight being added to the aircraft.

U.S. Pat. No. 4,884,444, which issued to Tuckey on Dec. 5, 1989, describes a motor-driven material level indicator. The apparatus is intended for indicating level of fluent materials, such as gasoline in an automobile tank, which comprises an impeller extending vertically through at least a major portion of the vessel in physical contact with material in the vessel. An electric motor is coupled to the impeller and connected to a source of electrical energy for rotating the impeller against drag imparted thereto by the material. Material level is indicated as a continuous function of load applied to the motor by the rotating impeller.

The patents described above are hereby expressly incorporated by reference in the description of the present invention.

Most fuel tank measurement devices measure a linear dimension, such as the depth of fuel remaining in the fuel tank, and then use that linear dimension as a representation of the volume of fuel remaining in the fuel tank. The volume of liquid remaining in a liquid reservoir, such as the fuel tank described above, is typically measured in this way. However, many types of fuel tanks are not uniform in volume at all of the possible magnitudes of the incremental changes in linear depth measurement. As a result, the depth of fuel remaining in a fuel tank is not always a reliable indicator of the actual volume of fuel remaining in the fuel tank. It would therefore be significantly beneficial if a measuring system could be provided which is self calibrating and, through normal use of the fuel tank, determines an accurate relationship between the linear depth measurement and the volume remaining in the fuel tank for all of the potential depth measurements between a minimum magnitude, when the tank is empty, and a maximum magnitude, when the tank is full. It would also be beneficial if the system could be self calibrating without the need for prior knowledge of the tank's shape or linear dimensions.

SUMMARY OF THE INVENTION

A method for determining the amount of liquid in a reservoir, in accordance with a preferred embodiment of the present invention, comprises the steps of measuring a depth of the liquid in the reservoir during a period of time when the depth of the liquid changes from a first depth magnitude to a second depth magnitude and also monitoring an amount of the fluid which is removed from the reservoir during the period of time when the depth of the liquid changes from the first depth magnitude to the second depth magnitude. The method further comprises the step of determining a first relationship between the difference between the first and second depth magnitudes and the amount of the fluid which is removed from the reservoir during that period of time when the depth of the liquid changes from the first to the second depth magnitude. The method comprises the step of storing the first relationship and using the first relationship to determine an amount of the fluid remaining in the reservoir as a function of a measured depth magnitude which is between the first and second depth magnitudes.

The present invention can further comprise a step of calculating a second relationship between an amount of the fluid removed from the reservoir when the depth of the liquid changes from the second depth magnitude to a minimum depth magnitude. The method of the present invention can further comprise the step of calculating a third relationship between an amount of the fluid removed from the reservoir when the depth of the liquid changes from a maximum depth magnitude to the first depth magnitude. In a preferred embodiment, the second and third relationships are linear.

The steps of the present invention comprise providing a depth measuring device, measuring a change in the depth of the liquid within a reservoir, measuring a quantity of liquid removed from the reservoir contemporaneous with the change in depth from a first depth magnitude to a second depth magnitude. It further comprises the step of determining a quantitative relationship between the change in the depth and the quantity of liquid removed from the reservoir contemporaneous with the change in depth. Also, the present invention comprises the step of storing the quantitative relationship in association with the first and second depth magnitudes.

The method of the present invention can comprise an initial step of providing an estimated relationship between a plurality of magnitudes of liquid remaining in the reservoir and an associated plurality of magnitudes of depths of the liquid. The estimated relationship can be stored in a table within a memory device of a microprocessor. During the performance of the method of the present invention, it can further comprise the step of modifying a portion of the estimated relationship, which is determined as a function of the first and second depth magnitudes, through the use of the quantitative relationship between the change in the depth and the quantity of liquid. It can further comprise the step of changing the estimated relationship to reflect a linear relationship between the change in the depth and the quantity of liquid for magnitudes of the depth between the second depth magnitude and a minimum expected magnitude of the depth magnitude. Additionally, the method of the present invention can further comprise the step of changing the estimated relationship to reflect a linear relationship between the change in the depth and the quantity of liquid for magnitudes of the depth between the first depth magnitude and a maximum expected magnitude of the depth magnitude.

The modified portion of the estimated relationship can be selected as a function of the average value of the first and second depth magnitudes or, alternatively, as a function of the range defined by the values of the first and second depth magnitudes.

In certain applications of the present invention, the second depth magnitude is generally equal to a minimum expected magnitude of the depth magnitude, such as when the reservoir is empty. The first depth magnitude is generally equal to a maximum expected magnitude of the depth magnitude, as when the tank is filled, in a preferred embodiment. The relationship between the change in the depth and the quantity of liquid is a slope calculated by dividing the quantity of liquid by the change in the depth, in certain preferred embodiments of the present invention. As described above, the liquid is typically a fuel, such as gasoline, and the fuel is injected by a fuel injector associated with an internal combustion engine. The quantity of fuel removed from the reservoir, as described above, is measured by accumulating the quantity of fuel injected by the fuel injector during the change in depth from the first depth magnitude to the second depth magnitude.

BRIEF DESCRIPTION OF THE DRAWINGS

The present invention will be more fully and completely understood from a reading of the description of the preferred embodiment of the present invention in conjunction with the drawings, in which:

FIG. 7 is a table associated with FIG. 6;

FIG. 9 is a graphical representation associated with FIG. 8;

DESCRIPTION OF THE PREFERRED EMBODIMENT

Figure 1:
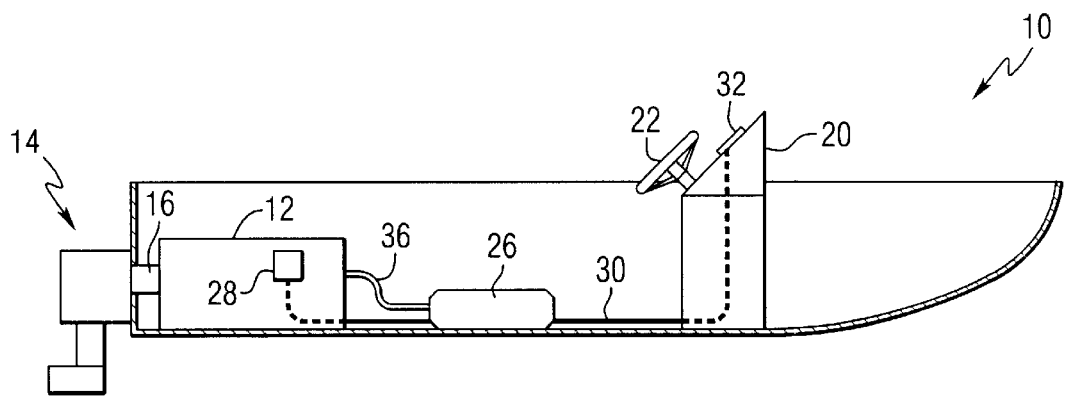
FIG. 1 is a simplified representation of a marine vessel with a fuel supply system.

Throughout the description of the preferred embodiment of the present invention, like components will be identified by like reference numerals.

FIG. 1 is a highly simplified schematic representation of a marine vessel 10 having an engine 12 which drives a marine propulsion engine 14 which, in this illustration, is schematically represented as a sterndrive unit. An output shaft 16 of the internal combustion engine 12 is connected in torque transmitting relation with the transom mounted portion of the marine propulsion unit 14. A helm station 20 is illustrated with a steering wheel 22. An operator of the marine vessel 10 would typically control the operation of the marine vessel from a position near the helm 20. A fuel tank 26 is provided to store fuel for use by the engine 12.

With continued reference to FIG. 1, the engine 12 is provided with an engine control unit 28. The engine control unit, in this illustration, is connected to a communication bus 30 which, in turn, is also connected to a fuel gauge 32 located at the helm station. A conduit 36 is connected between the engine 12 and the fuel tank 26 to allow liquid fuel, such as gasoline, to flow from the fuel tank 26 to the engine 12. Typically, the fuel tank 26 is provided with some type of sensor that is responsive to the liquid level within the fuel tank 26 and provides a signal which is representative of the quantity of fuel remaining in the tank. This signal is typically annunciated on the gauge 32 to allow the operator of the marine vessel 10 to know the quantity of fuel remaining in the tank.

The shape of the fuel tank 26 can vary significantly from one application to another. This is particularly true when the fuel tank is intended for use in a marine vessel, where space is limited and available volume does not usually provide flat surfaces or right angles. Typically, the fuel tank 26 is shaped to conveniently fit into the bilge portion of the marine vessel 10.

Figure 2:
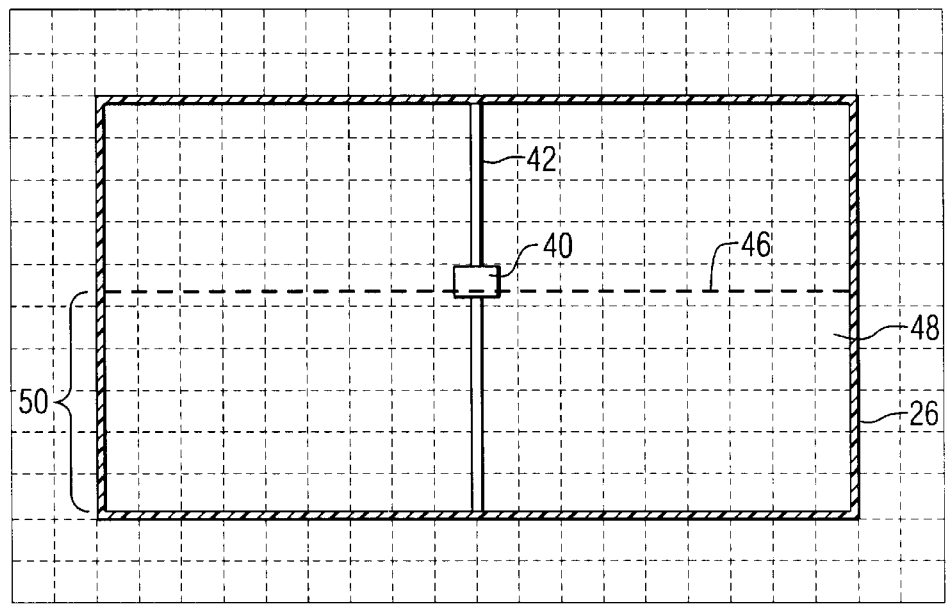
FIGS. 2 and 3 are graphical representations of fuel tanks.

In FIG. 2, a fuel tank 26 with a rectangular cross section is illustrated. Although FIG. 2 is two dimensional, it is intended to represent a fuel tank 26 that is a parallelepiped in shape, with six sides in which opposing sides are parallel to each other. Within the hypothetical uniformly shaped fuel tank 26, a float 40 is provided which is movable in a vertical direction along a guide member 42. As the level 46 of fuel 48 changes, the float mechanism 40 provides an output signal which is representative of the depth 50 of the liquid fuel 48. Since many different types of fuel level sensors are well known to those skilled in the art, the operation of the fuel sensor will not be described in detail herein. It should be understood, however, that the signal provided by the fuel level sensor 40 represents a magnitude of fuel depth 50 which is used to inform the operator of the marine vessel how much fuel 48 remains in the fuel tank 26. When the fuel tank 26 is of a uniform shape, such as a parallelepiped, the change in fuel 48 remaining in the tank is linearly proportional to the depth 50 of the fuel. For each incremental change in the linear magnitude of the fuel depth 50, the remaining fuel volume 48 in the tank 26 changes by a predictable amount associated with that incremental change. When fuel tanks of this type are used in a vehicle, the depth 50 of the fuel is an accurate analog representation of the volume of fuel remaining in the tank.

Figures 3, 4:
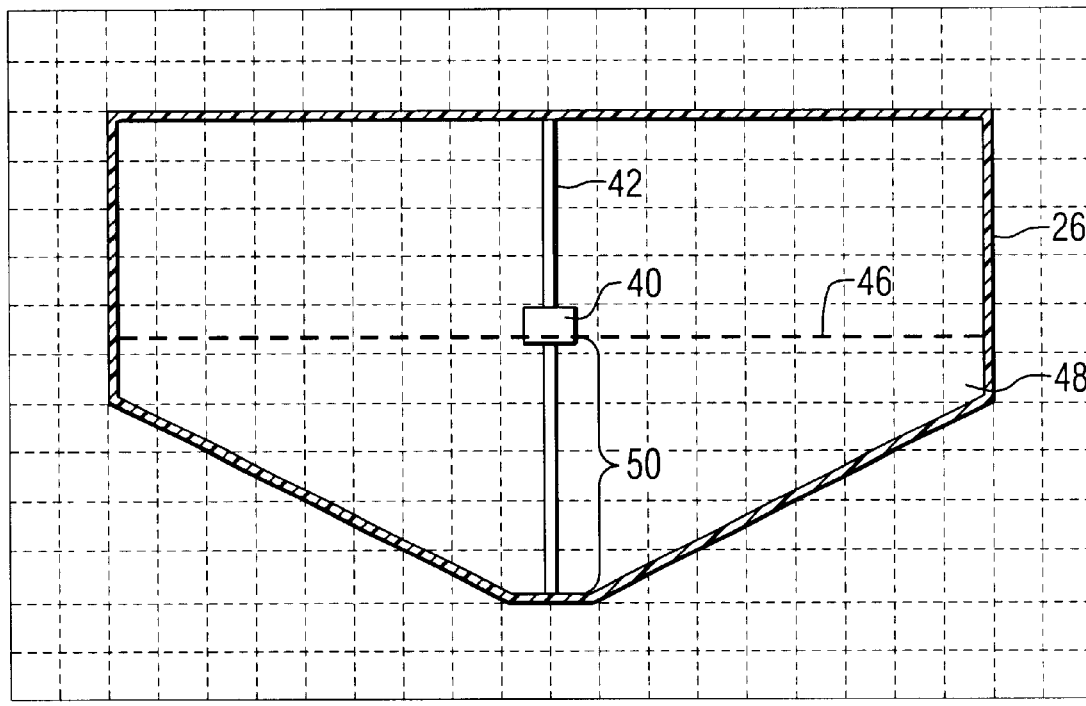
FIG. 4 is a table showing an initial relationship of depth to volume for a fuel tank shown in FIG. 3.

In FIG. 3, a more typical fuel tank 26 is shown in which the shape of the tank results in the magnitude of depth 50 being non linear in relation to the remaining fuel 48 in the tank over a least a portion of the travel of the float mechanism 40. For purposes of clarity in the description of the present invention, FIGS. 2 and 3 have been provided with a background grid showing squares of equal area. Since the figures are two dimensional representations, the following description will assume that the two dimensional areas shown in the figures and referred to in the following discussions are representative of the associated volumes of fuel 48 remaining in the fuel tank 26. Furthermore, throughout the following description, the absolute magnitudes of the numbers used are not intended to represent a specific quantity (such as gallons, liters, or cubic feet) but, instead, are intended to illustrate the basic principles related to the present invention and provide relative magnitudes to facilitate this description.

With reference to FIGS. 3 and 4, it can be seen that the linear depth dimension 50 is associated with an actual volumetric magnitude that represents the volume of fuel 48 contained within the fuel tank 26 for each of ten exemplary depth dimensions 50. It should be understood, however, that the actual volume shown in the center column of FIG. 4 need not ever be actually measured when the present invention is used. Also shown in FIG. 4 is an estimation of the volume (i.e. the rightmost column) associated with each of the depth dimensions. The estimated values are based on an assumption of linearity between the depth 50 and the volume of fuel 48 remaining in the tank. Other assumed relationships can also be used for these estimated values. If the system is intended for use with many different boat designs and fuel tank designs, it is beneficial if the fuel measuring system is capable of self calibrating without any predetermined knowledge of the precise shape of the fuel tank 26. Therefore, the present invention is made to be workable with an initial estimation based on assumed linearity, or other relationships, between the depth 50 and the volume of fuel 48 remaining in the tank 26. These estimated values, shown in the rightmost column in FIG. 4, are used initially by the present invention and the values initially placed in this column are intended to be changed as further information is obtained.

Figure 5:
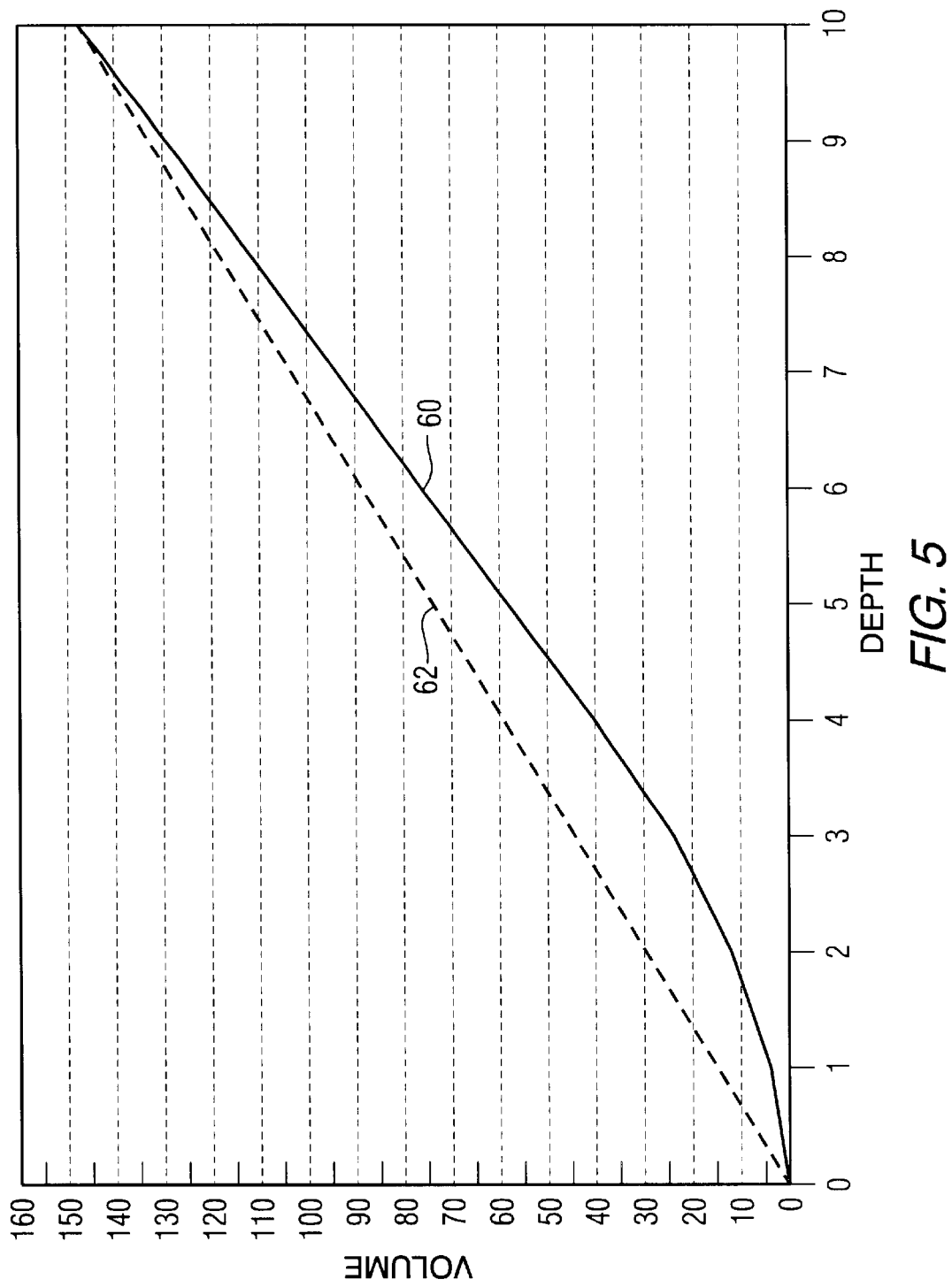
FIGS. 5 and 6 show graphical representations of remaining fuel volume as a function of measured fuel depth at two stages of operation of the marine vessel.

FIG. 5 is a graphical representation of the actual volume 60, numerically shown in the center column of FIG. 4, and the estimated volume 62, numerically shown in the rightmost column of FIG. 4, graphically represented as a function of the depth which is numerically shown in the leftmost column of FIG. 4. The actual volume 60 is generally not known as a function of the depth when the system is initially installed in a marine vessel. Typically, the maximum capacity of the fuel tank 26 is known or can be easily determined. The estimated value 62 is mathematically determined by assuming a linear relationship between volume and depth. The estimated value 62 can suffice until the present invention obtains sufficient information to create a more accurate relationship between depth and volume based on empirical results obtained during the self calibration procedure.

Figure 6:
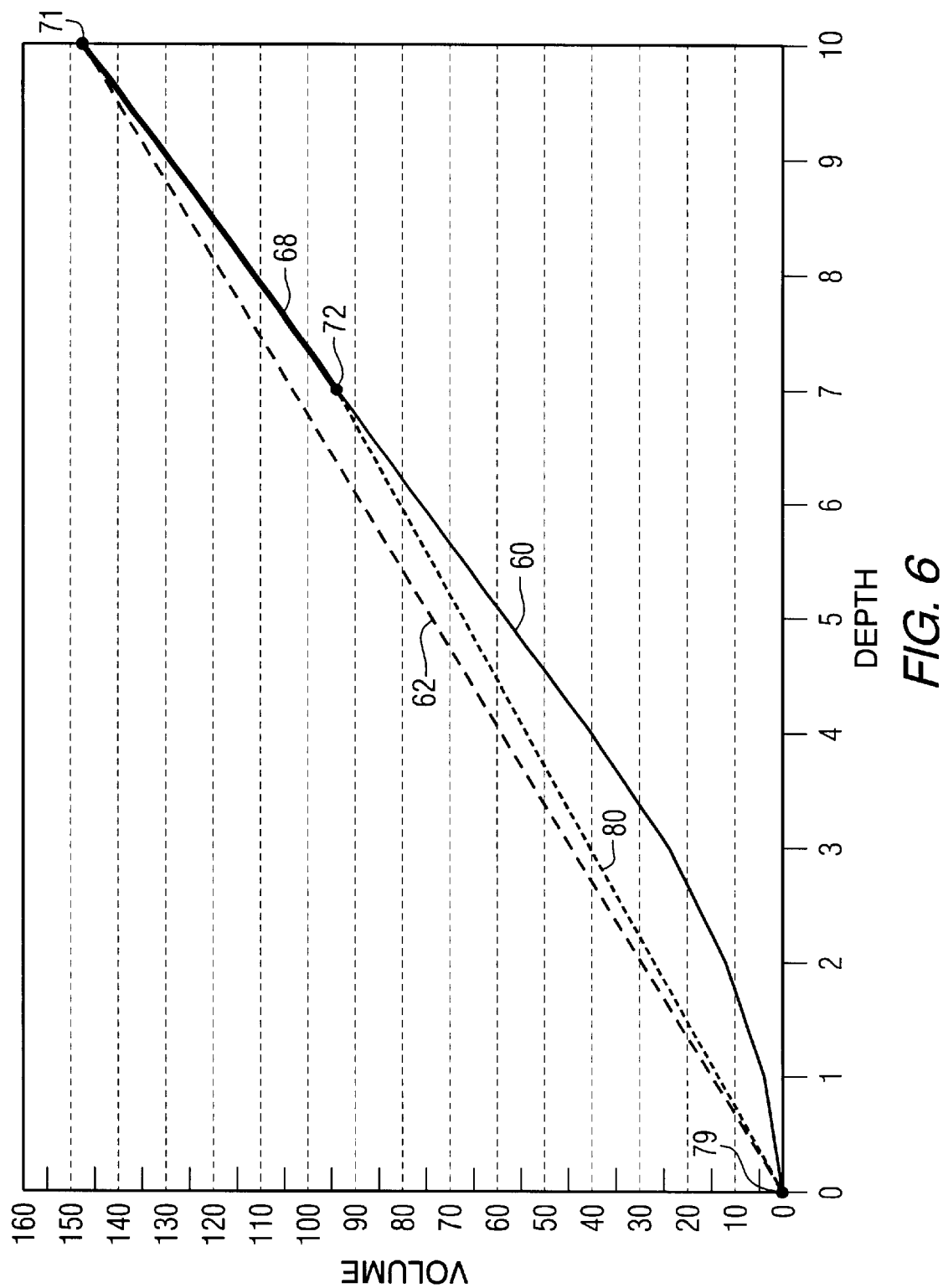

With reference to FIGS. 4–7, the present invention takes advantage of certain knowledge relating to the actual consumption of fuel as the depth of fuel changes. In FIG. 6, the darkened line 68 represents the actual knowledge relating to fuel used as the depth changes from 10 to 7. In fuel injected engines controlled by an engine control unit (ECU), it is well known that the engine control unit (ECU) can easily and precisely monitor the actual fuel used during each fuel injection event and maintain a cumulative total of all of the fuel used by the engine during any specified period of time. As an example, when the operator of the marine vessel fills the tank 26, a first depth magnitude 71 is provided by the depth sensor to the engine control unit. This first depth magnitude 71 is stored by the engine control unit as it executes the steps of the present invention. At some later time, after a quantity of fuel is removed from the fuel tank 26 and used by the engine 12, a second depth magnitude 72 is obtained. It should be understood, that during the operation of the engine, numerous intermediate depth magnitudes are sensed by the depth sensor and provided to the engine control unit 28. Each time a lesser depth magnitude is obtained by the engine control unit, the previously lowest magnitude is discarded and replaced by the newer lowest depth magnitude. Eventually, the operator of the marine vessel will stop consuming fuel and refill the fuel tank 26. When this occurs, the first and second depth magnitudes, 71 and 72, are stored and used to calculate the slope of the relationship represented by line 68. This calculation does not specify the specific location of line 68 in the graphical representation of FIG. 6, but the slope of line 68 is known and since the position of the estimation line 62, as described in conjunction with FIG. 5, is known the slope is used to construct line 68, or the mathematical equivalent thereof, as a line which coincides with the maximum contents of the fuel tank 26 which is defined by point 71 in FIG. 6. In other words, line 68 has the slope calculated as a function of the depth change, from the first depth magnitude 71 to the second depth magnitude 72, and the actual quantity of fuel used as obtained from the engine control unit which accumulates the total number of fuel injection pulses occurring contemporaneously with the change in depth from point 71 to 72. Obviously, it is significantly helpful to the operation of the present invention if the operator of the marine vessel fills the fuel tank 26 to its maximum capacity before operating the marine vessel. This provides an absolute volume reference at point 71. However, this is not an absolute necessity for the operation of the present invention, as will be described below.

With continued reference to FIG. 6, dashed line 80 is then calculated as a function of the second depth magnitude 72 and the minimum depth magnitude which, in this case, is zero which signifies an empty fuel tank 26. In this embodiment of the present invention, the critical relationship is assumed to be linear as represented by dashed line 80 in FIG. 6. It should be noted that dashed line 80 in FIG. 6 does not lie on dashed line 62 which is described above in conjunction with FIG. 5 and illustrated, for purposes of comparison, in FIG. 6.

In essence, the present invention allows the fuel system to learn a more accurate relationship between the depth magnitude and the volume of fuel remaining in the tank 26. The portion from point 72 to point 79, which represents an empty fuel tank 26, remains unknown because the marine vessel has not been operated within that range of depth magnitudes as provided by the fuel depth sensor. With reference to FIGS. 6 and 7, it can be seen that the estimated line 62 has been replaced by a new estimated line 80 and the known line 68.

Figure 8:
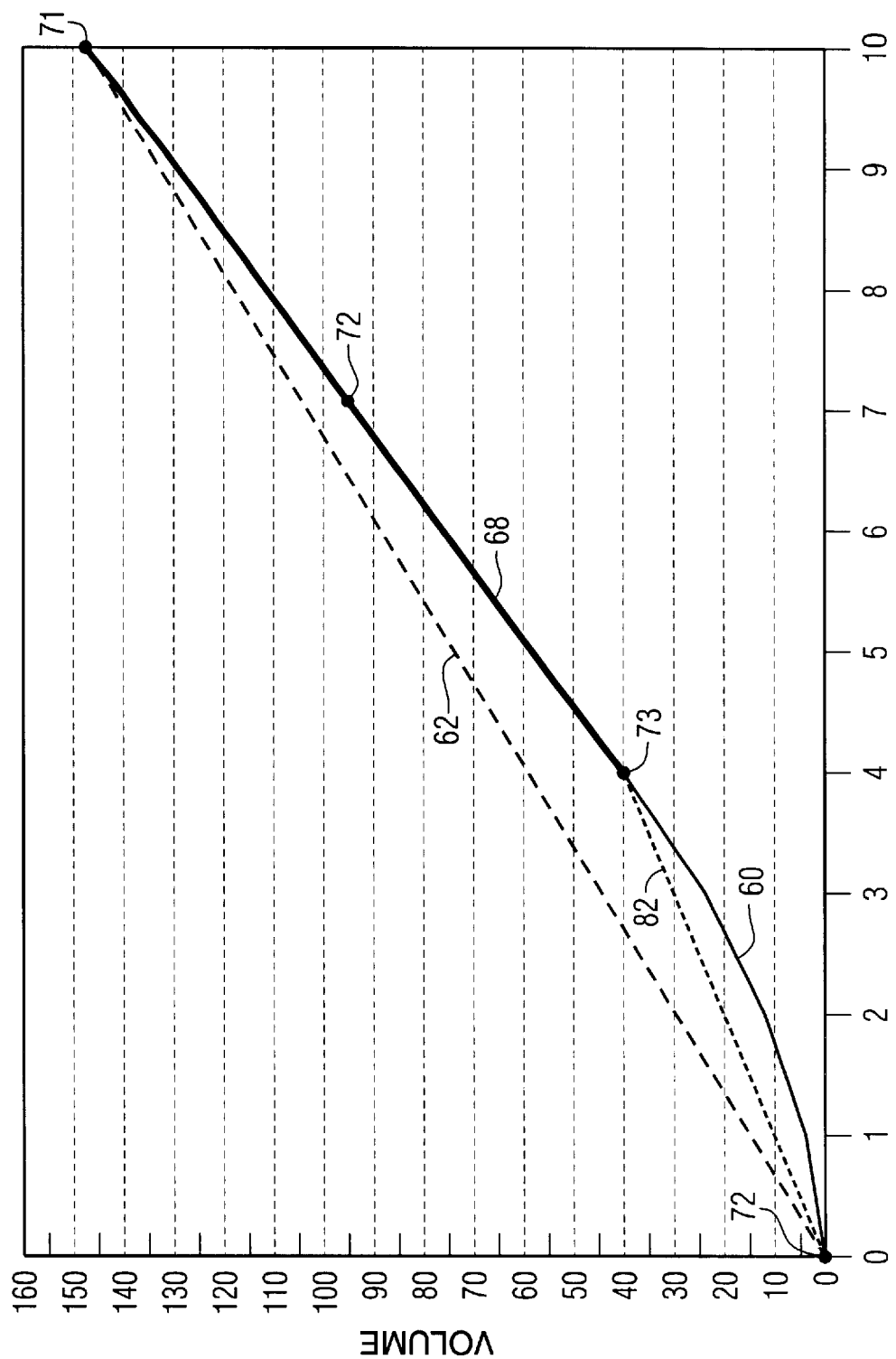
FIG. 8 is a graphical representation of a subsequent condition of the fuel tank shown in FIG. 3.

With reference to FIGS. 8 and 9, point 72 represents more information obtained regarding the second depth magnitude. When the operator continues to operate the marine vessel from a first fuel depth magnitude 71 to a second fuel depth magnitude 73, which is significantly lower than point 72 described above, more information is obtained regarding the relationship between the depth magnitudes and their related volume magnitudes. For purposes of reference, the original estimate line 62 is shown in FIG. 8. However, as illustrated in the table of FIG. 9, the estimation line is replaced by a new estimation line 82 which extends from the second depth magnitude 73 to point 79 which represents an essentially empty fuel tank 26. As can be seen, the error between the known and estimated relationships, represented by lines 68 and 82, and the actual volume 60 remaining in the fuel tank for those various depth magnitudes is significantly decreased. This can be seen by comparing FIGS. 5, 6 and 8. At fuel depth magnitudes above 4 in FIG. 8, accurate empirical information is available and the engine control unit can determine the remaining fuel volume 48 in the fuel tank 26 precisely above a depth magnitude of 4. Below a depth magnitude of 4, in the region that the marine vessel has never operated, the system continues to rely on an estimation 82 which is, however, significantly better than the original estimation line 62.

Figure 10:
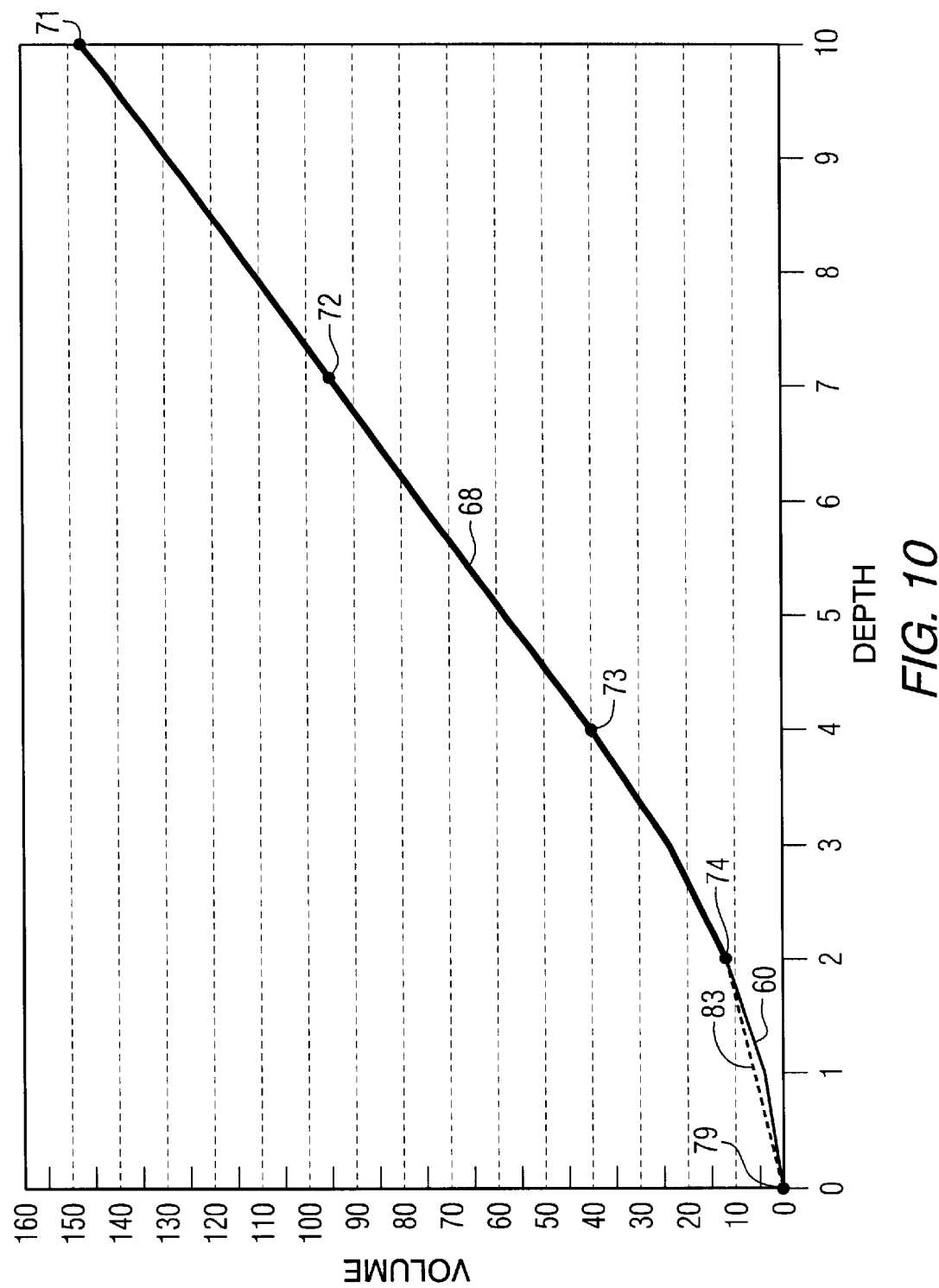
FIG. 10 is a graphical representation of the relationship of volume to measured depth at a time subsequent to the situation represented in FIG. 8.

FIG. 10 illustrates the results of the present invention after an even greater length of operation of the marine vessel by the operator. The actual empirical data available to the present invention relates to a change in depth of fuel from point 71, through points 72 and 73, to point 74 which is represented by a depth magnitude of 2. Line 68, which extends from point 71 to point 74, represents empirical information obtained by the present invention during the continued operation of the marine vessel. Only the estimation line 83, below a depth magnitude of 2, remains. All depth magnitudes above 2 are associated with an actual measured volume. Naturally, as the operator continues to use the marine vessel and consume fuel subsequent to the filling of the fuel tank 26, more data is continually received by the present invention. The precise accuracy of the present invention, which is obtained from empirical information, is continually improved as the depth magnitude is lowered during subsequent uses of the marine vessel.

Figure 11:
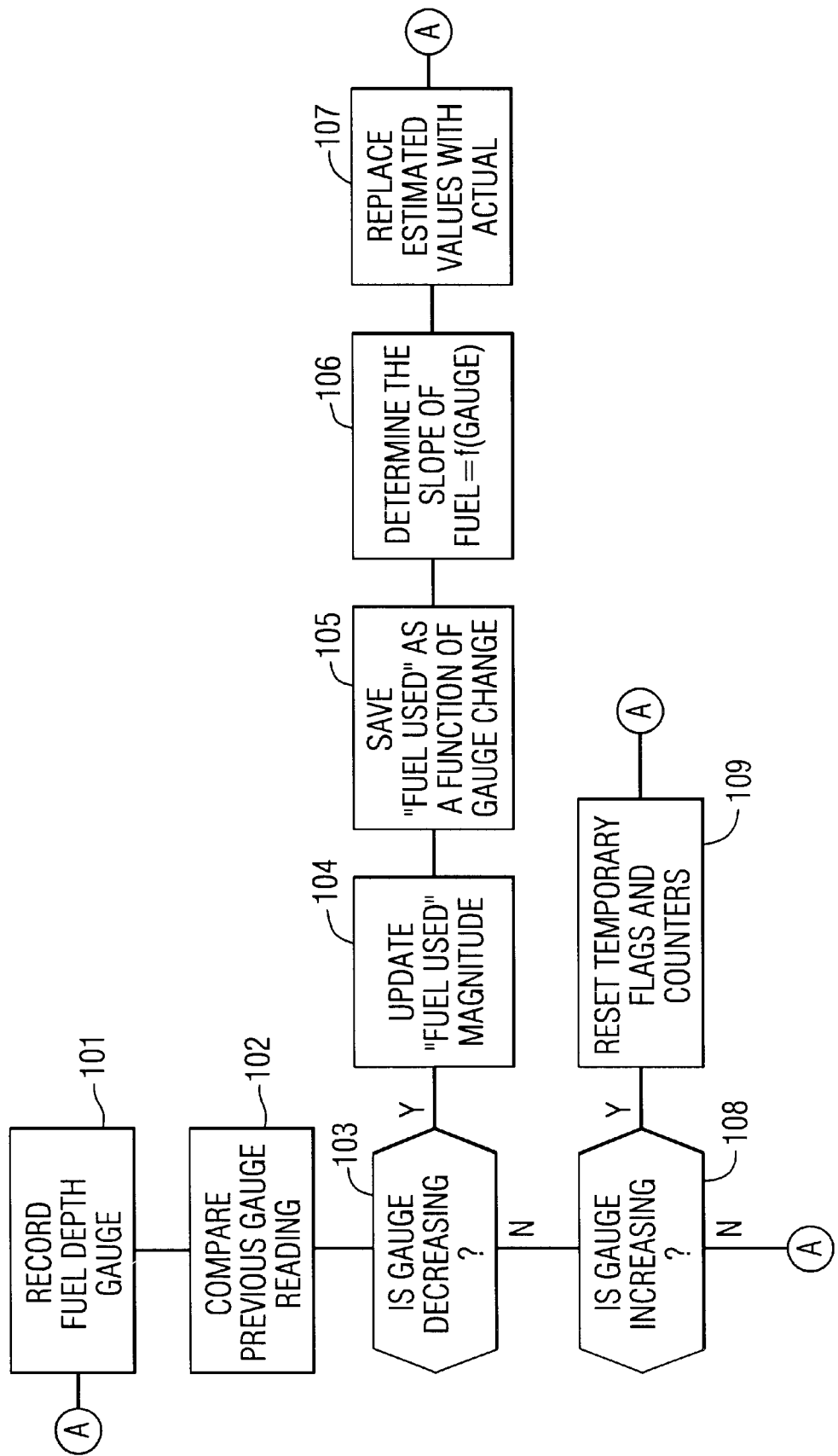
FIG. 11 is a simplified flow chart of the operation of the present invention.

FIG. 11 represents a highly simplified flow chart showing the basic steps of the present invention in one particularly preferred embodiment. It should be understood that many different algorithms could be used in the microprocessor of the engine control unit 28 to obtain the same results. The flow chart in FIG. 11 represents only one of those various specific approaches to implementing the present invention. Beginning at point A, the fuel depth gauge 40 is recorded at functional block 101. It is compared to the previous gauge reading, at functional block 102, to determine whether or not fuel continues to be used or, alternatively, the operator of the marine vessel has refilled the fuel tank 26. If the gauge continues to decrease, as determined by functional block 103, the engine control unit updates the "fuel used" magnitude which is a cumulative variable containing the total amount of fuel used by the fuel injectors since the algorithm shown in FIG. 11 began to monitor a decrease in depth gauge most recently. This is identified in functional block 104. This fuel magnitude is saved as a function of the change in the depth gauge at functional block 105. After performing the steps at functional blocks 104 and 105, the algorithm can determine a temporary slope calculation which represents the fuel used as a function in the change in the gauge readings. This is done at functional block 106. With reference to FIG. 10, this slope can be repeatedly calculated as the depth gauge changes from the first magnitude 71 to the successive lesser magnitudes, such as those represented by points 72 and 73 in FIG. 10. Functional block 107 in FIG. 11 represents the actual replacement of estimated values with actual values. The results of this step can be seen in FIGS. 4, 7, and 9 and in the extension of line segment 68 from FIG. 6 to FIG. 8 and then to FIG. 10. After this is complete, the flow chart returns to point A to repeat functional blocks 102–103.

With continued reference to FIG. 11, if the gauge is not decreasing as determined by functional block 103, the algorithm determines if the gauge is increasing at functional block 108. If it is increasing, this means that the operator is refilling the tank 26. At this point, the present invention resets its temporary flags and counters at functional block 109 and prepares itself to again begin checking changing depth magnitudes and monitoring the relationship between those changes and the depth magnitudes and the amount of fuel consumed contemporaneously with those changes.

Figure 12:
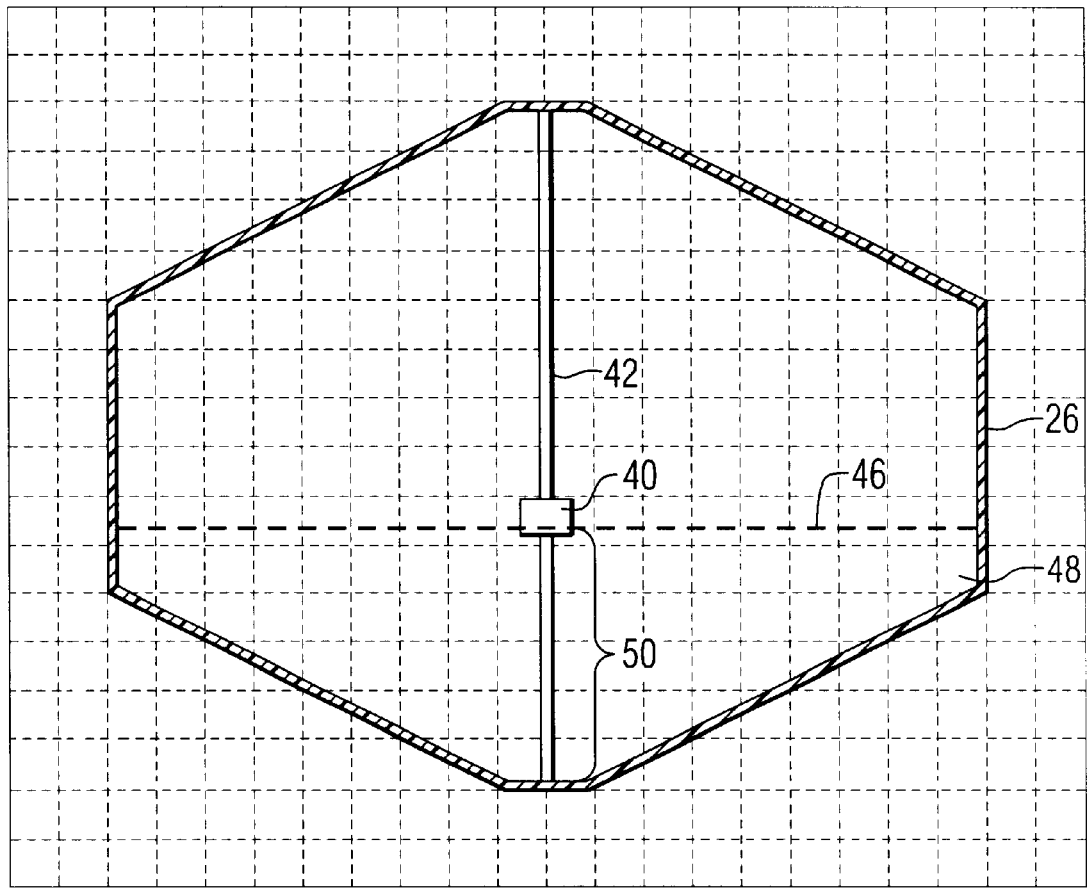
FIG. 12 is a fuel tank having a complex shape.
Figure 13:
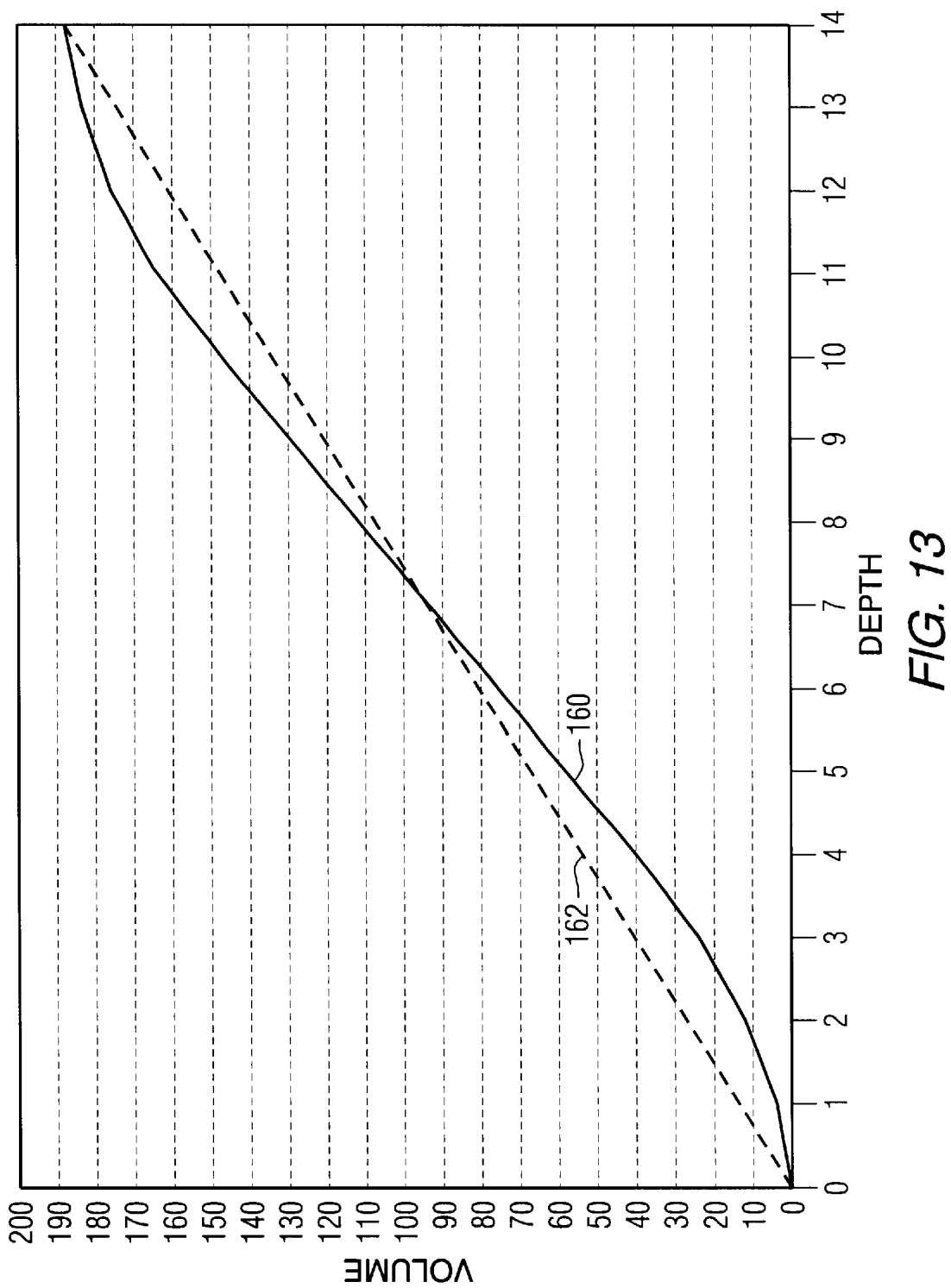
FIG. 13 shows the relationships between volume of fuel remaining in the fuel tank and the measured depth of fuel in the tank for the fuel tank shown in FIG. 12.

Although most fuel tanks are usually generally constant in cross section at their upper portions, it is possible that the present invention could be used in association with a fuel tank that is non uniform in cross section throughout most of its height, both at the bottom of the tank and near the top. FIG. 12 illustrates this type of structure of a fuel tank 26. FIG. 13 is a graphical representation of the relationships between the changes in depth and the associated changes in volume of fuel 48 remaining in the fuel tank 26 for various different depth magnitudes 50. Line 160 represents the actual, but unknown, relationship between the depth magnitudes and the volume remaining in the tank 26 and dashed line 162 represents a linear estimation of that relationship.

Figure 14:
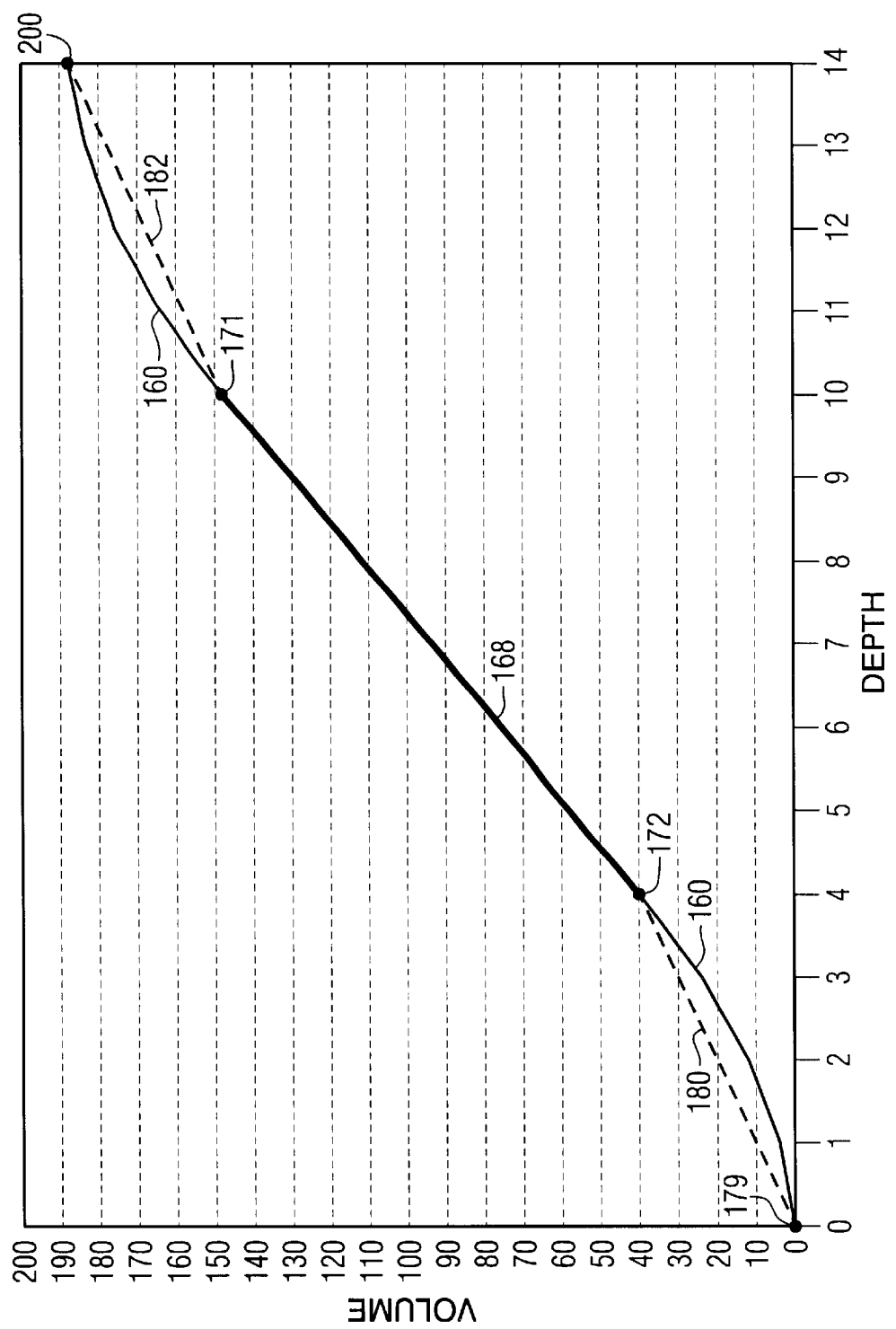
FIGS. 14 and 15 show graphical representations of remaining fuel volume as a function of measured fuel depth at two stages of operation in association with the fuel tank illustrated in FIG. 12.

With reference to FIGS. 12–14, line 168 represents a known actual usage of fuel volume empirically determined as a function of a change in depth 50 of the fuel 48. It should be noted that the first depth magnitude 171 is not at the full tank point associated with a depth value of 14 although that would have been a preferred method of applying the present invention. Instead, the operator of the marine vessel filled the tank up initially to a depth magnitude of 10. The operator then consumed fuel until the depth magnitude was equal to 4 as represented by the second depth magnitude 172 in FIG. 14. This allows the present invention to calculate the slope of line 168. However, the exact position, in a vertical location, in FIG. 14 is not known. The present invention only knows the first and second depth magnitudes, 171 and 172, and the total fuel consumed contemporaneously with the change in depth magnitude from points 171 to 172. The actual volumes of remaining fuel, at points 171 and 172, are not empirically known. At this point, the algorithm of the present invention could apply several different techniques to allocate the precise location of line 168 relative to the volume used during the decrease in depth magnitudes. Obviously, it would be significantly easier if the operator had filled the tank to a depth magnitude of 14 prior to operation of the vessel. However, the slope of line segment 168 can be applied to the estimation line 162, which is known, through various procedures. One would be to calculate the average value of the first and second depth magnitudes, 171 and 172, and then use that depth magnitude average value to place line 168 of a known slope over the estimation line 162 shown in FIG. 13. Alternatively, either the first depth magnitude 171 or the second depth magnitude 172 could be used to locate the known slope of line 168 to the estimation line 162. The average depth technique, described above, would result in the configuration shown in FIG. 14. Naturally, subsequent use of the marine vessel will allow the present invention to more accurately position the empirically determined line 168 with respect to the actual values represented by line 160 in FIGS. 13 and 14. After the line segment 168 is located mathematically, relative to the depth and volume, linear estimations represented by dashed lines 180 and 182 can be provided from the first depth magnitude 171 to the maximum depth magnitude 200, which represents a full tank, and from the second depth magnitude 172 to point 179 which represents an empty tank. Even though lines 180 and 182 are estimation lines based on an assumption of linearity, which is not actually correct, the errors between lines 160 and 180 and between lines 160 and 182 are less than would have resulted if the original estimation line 162 is used.

Figure 15:
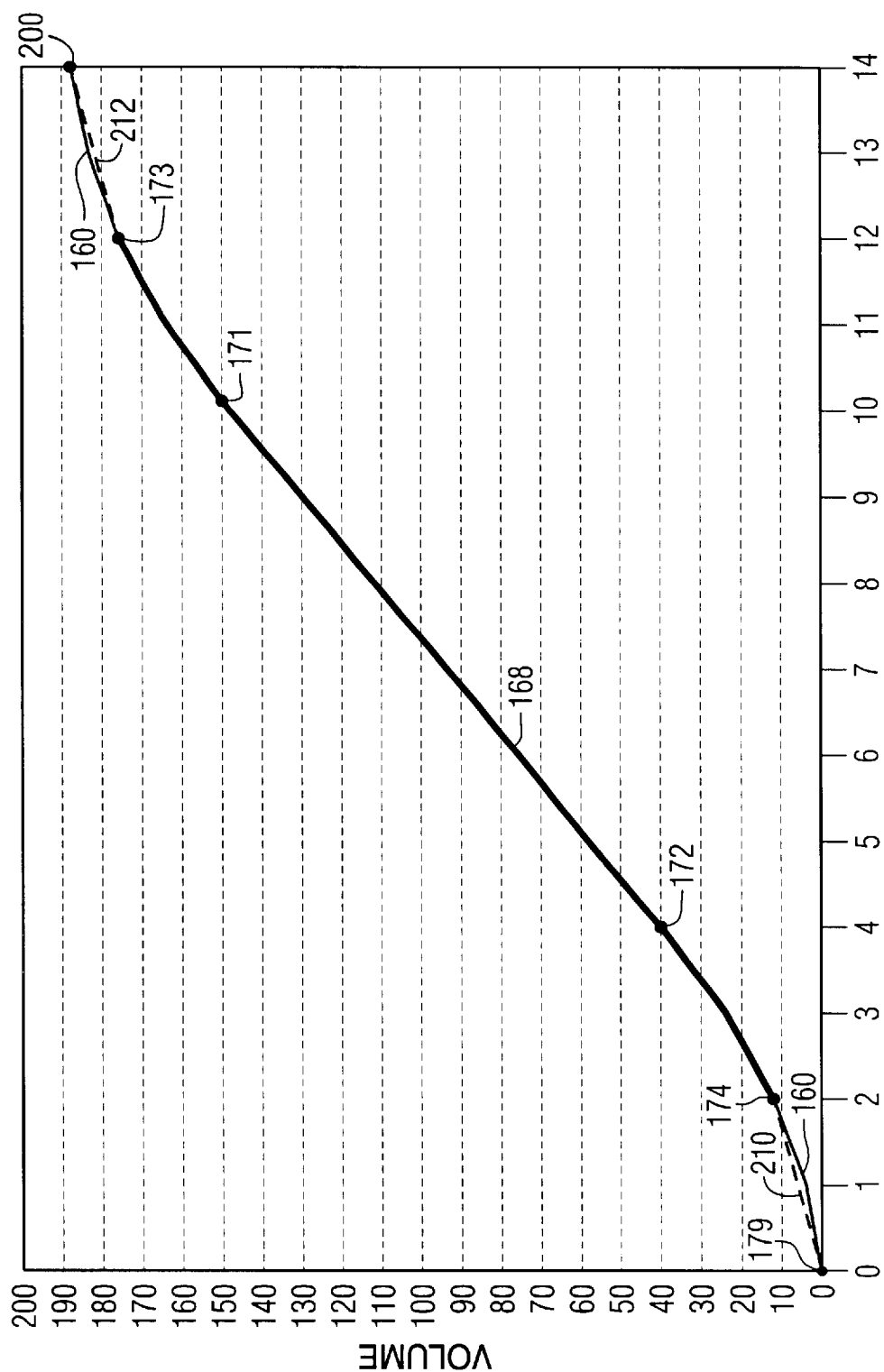

FIG. 15 shows the results that would occur if the present invention is continued through the range of from first depth magnitude 173 to a second depth magnitude 174, which passes through points 171 and 172 described above. Linear estimations represented by dashed lines 210 and 212, in a manner similar to that described above in relation to dashed lines 180 and 182 in FIG. 14, can be provided from the first depth magnitude 173 to the maximum depth magnitude 200, which represents a fill tank, and from the second depth magnitude 174 to point 179 which represents an empty tank. Even though lines 210 and 212 are estimation lines based on an assumption of linearity, which is not actually correct, the errors between lines 160 and 210 and between lines 160 and 212 are less than would have resulted if the original estimation line 162 is used. Naturally, the predictive value of the present invention is much more accurate if greater magnitudes of change in depth magnitude are available. Eventually, after the fuel tank 26 is operated from a full condition to a nearly empty condition, the entire relationship of volume to depth will be empirically determined, as represented by line 168, and no significant estimation will be required.

The advantage of the present invention is that it can be applied to a fuel system in which the shape of the fuel tank is unknown or undetermined. The initial provision of an estimated linear relationship allows the system to operate until more precise information is obtained dynamically during the operation of the marine vessel. Although it is easier to determine the calibration values when the operator of the marine vessel fills the fuel tank and operates the marine vessel until the fuel tank is nearly empty, it has been shown above that this full range of fuel tank filling is not required.

The present invention can be applied in several different and unique embodiments. Some embodiments can require that the fuel tank be completely filled before the calibration procedure, described above, is implemented. Other embodiments do not require that the tank be filled. Some embodiments of the present invention can be manually activated by the operator of the marine vessel in order to place the fuel system in a calibration mode. Similarly, the calibration system can be implemented only once with that implementation being initiated by the first filling of the fuel tank by the operator. These, and other alternative embodiments, are within the scope of the present invention.

Although the present invention has been described in particular detail to illustrate several particular embodiments, it should be understood that alternate embodiments are also within its scope.

I claim:

1. A method for determining the amount of liquid in a reservoir, comprising the steps of:

providing a depth measuring device associated with said reservoir, said depth measuring device having an output signal which is representative of a depth of said liquid within said reservoir;

measuring a change in said depth of said liquid, from a first depth magnitude to a second depth magnitude;

measuring a quantity of liquid removed from said reservoir contemporaneous with said change in depth from said first depth magnitude to said second depth magnitude;

determining a quantitative relationship between said change in said depth and said quantity of liquid removed from said reservoir contemporaneous with said change in depth from said first depth magnitude to said second depth magnitude;

storing said quantitative relationship in association with said first and second depth magnitudes;

providing an estimated relationship between a plurality of magnitudes of liquid remaining in said reservoir and an associated plurality of magnitudes of said depth of said liquid;

modifying a portion of said estimated relationship, which is determined as a function of said first and second depth magnitudes, through the use of said quantitative relationship between said change in said depth and said quantity of liquid; and changing said estimated relationship to reflect a linear relationship between said change in said depth and said quantity of liquid for magnitudes of said depth between said second depth magnitude and a minimum expected magnitude of said depth magnitude.

2. The method of claim 1, wherein:

said estimated relationship is stored in a table within a memory device of a microprocessor.

3. The method of claim 1, wherein:

changing said estimated relationship to reflect a linear relationship between said change in said depth and said quantity of liquid for magnitudes of said depth between said first depth magnitude and a maximum expected magnitude of said depth magnitude.

4. The method of claim 1, wherein:

said modified portion of said estimated relationship is selected as a function of the average value of said first and second depth magnitudes.

5. The method of claim 1, wherein:

said modified portion of said estimated relationship is selected as a function of the range defined by the values of said first and second depth magnitudes.

6. The method of claim 1, wherein:

said second depth magnitude is generally equal to a minimum expected magnitude of said depth magnitude.

7. The method of claim 1, wherein:

said relationship between said change in said depth and said quantity of liquid is a slope calculated by dividing said quantity of liquid by said change in said depth.

8. The method of claim 1, wherein:

said first depth magnitude is generally equal to a maximum expected magnitude of said depth magnitude.

9. The method of claim 1, wherein:

said liquid is a fuel.

10. The method of claim 9, wherein:

said fuel is injected by a fuel injector associated with an internal combustion engine.

11. The method of claim 10, wherein:

said quantity of liquid removed from said reservoir is measured by accumulating the total quantity of fuel injected by said fuel injector during said change in depth from said first depth magnitude to said second depth magnitude.

12. The method of claim 1, wherein:

said liquid is fuel and said reservoir is a fuel tank of a marine vessel.

13. A method for determining the amount of liquid in a reservoir, comprising the steps of:

providing a depth measuring device associated with said reservoir, said depth measuring device having an output signal which is representative of a depth of said liquid within said reservoir;

providing an estimated relationship between a plurality of magnitudes of liquid remaining in said reservoir and an associated plurality of magnitudes of said depth of said liquid, said estimated relationship being stored in a table within a memory device associated with a microprocessor;

measuring a change in said depth of said liquid, from a first depth magnitude to a second depth magnitude;

measuring a quantity of liquid removed from said reservoir contemporaneous with said change in depth from said first depth magnitude to said second depth magnitude;

determining a quantitative relationship between said change in said depth and said quantity of liquid;

storing said quantitative relationship in association with said first and second depth magnitudes;

modifying a portion of said estimated relationship, which is determined as a function of said first and second depth magnitudes, through the use of said quantitative relationship between said change in said depth and said quantity of liquid; and changing said estimated relationship to reflect a linear relationship between said change in said depth and said quantity of liquid for magnitudes of said depth between said first depth magnitude and a maximum expected magnitude of said depth magnitude.

14. The method of claim 13, further comprising:

changing said estimated relationship to reflect a linear relationship between said change in said depth and said quantity of liquid for magnitudes of said depth between said second depth magnitude and a minimum expected magnitude of said depth magnitude.

15. The method of claim 14, wherein:

said modified portion of said estimated relationship is selected as a function of the average value of said first and second depth magnitudes.

16. The method of claim 13, wherein:

said modified portion of said estimated relationship is selected as a function of the range defined by the values of said first and second depth magnitudes.

17. The method of claim 13, wherein:

said second depth magnitude is generally equal to a minimum expected magnitude of said depth magnitude.

18. The method of claim 13, wherein:

said relationship between said change in said depth and said quantity of liquid is a slope calculated by dividing said quantity of liquid by said change in said depth.

19. The method of claim 13, wherein:

said first depth magnitude is generally equal to a maximum expected magnitude of said depth magnitude.

20. The method of claim 13, wherein:

said liquid is a fuel.

21. The method of claim 20, wherein:

said fuel is injected by a fuel injector associated with an internal combustion engine.

22. The method of claim 21, wherein:

said quantity of liquid removed from said reservoir is measured by accumulating the total quantity of fuel injected by said fuel injector during said change in depth from said first depth magnitude to said second depth magnitude.

23. The method of claim 22, wherein:

said liquid is fuel and said reservoir is a fuel tank of a marine vessel.

* * * * *